No. 785,887. Patented March 28, 1905.

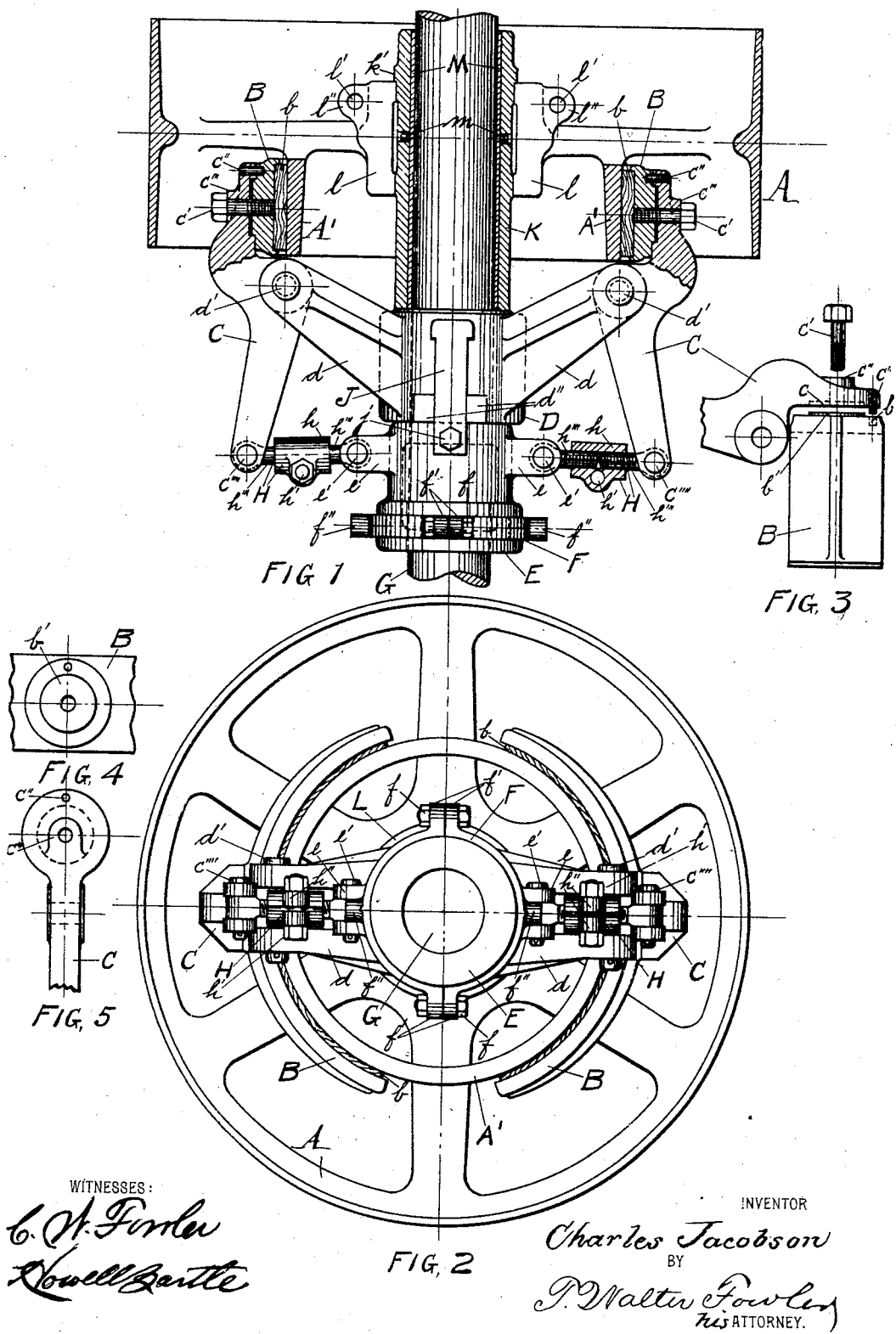

UNITED STATES PATENT OFFICE.

CHARLES JACOBSON, OF WARREN, PENNSYLVANIA.

CLUTCH.

SPECIFICATION forming part of Letters Patent No. 785,887, dated March 28, 1905.

Application filed April 17, 1901. Renewed July 15, 1904. Serial No. 216,692.

*To all whom it may concern:*

Be it known that I, CHARLES JACOBSON, a citizen of the United States, residing at Warren, in the county of Warren and State of Pennsylvania, have invented new and useful Improvements in Clutches, of which the following is a specification.

My invention relates to certain new and useful improvements in friction-clutches of what is known as the "segment-clamping" type adapted to frictionally engage a pulley loose on a driving-shaft, and thereby connect the pulley with said shaft; and my invention consists of the parts and the constructions and combinations of parts hereinafter described and claimed.

Figure 1 is an elevation, partially in section, of a friction-clutch and pulley embodying my invention. Fig. 2 is an end view of Fig. 1. Fig. 3 is a detail of one of the segments or blocks, a portion of its corresponding lever, and a cap-screw, said lever being shown as separated a short distance from the segment or block and said screw being shown detached to illustrate the manner of fitting these parts together. Fig. 4 is a plan view of a portion of a segment or block. Fig. 5 is a plan view of a portion of a lever C.

Similar letters of reference indicate corresponding parts throughout the several figures.

Referring now to Figs. 1 and 2, the pulley A is of appropriate type and is provided with a split hub $l$, into which is clamped or otherwise secured a bushing K, the means herein shown for this purpose being the bolts $l'$, which are passed through the lugs $l''$ formed on the hub. Fixedly secured to the shaft is a spider D of suitable form and construction and which is designed to form a member of the clutch, the spider including in its construction the radial upwardly-inclined arms $d$, to the outer ends of which the clutch-operating levers C are fulcrumed, as plainly indicated in Fig. 1. These levers C are fulcrumed at points between opposite ends, as shown at $d'$, and their short arms carry the friction segments or blocks. These segments or blocks B are so disposed that each forms a portion of substantially a ring adapted to fit the outer periphery of a ring A', secured to or forming a part of the pulley, this ring A' being shown in Figs. 1 and 2 as projecting from the radial arms of the pulley and being confined substantially within said pulley, and the said segments or blocks B are preferably faced with wood or other well-known and appropriate material $b$, adapted to form shoes to frictionally engage and act upon the circumference or outer periphery of the ring A'. The segments or blocks B are themselves secured or attached to the levers in a manner substantially as hereinafter indicated.

The driving-shaft C has slidably mounted upon it a collar or sleeve E, provided with ears or lugs $e$, said collar being movable longitudinally along said shaft by means of a yoke F, which may be operated by any of the well-known forms of shifting fork attached to lugs $f''$ of the collar or by any appropriate form of shifting device where the size of the clutch demands such an arrangement. I do not herein illustrate any particular form of shifting device, as the same forms no essential portion of the present invention. To the lugs or ears $e$ of the collar or sleeve one end of each adjustable link H is pivotally secured, the outer end of said link being pivotally secured to the adjacent end of the fulcrumed lever C. The links H include in their construction the turnbuckles $h$, preferably split or divided on one side and this divided portion provided with lugs or ears to receive a bolt $h'$, adapted to clamp the turnbuckle in its proper position, and thereby prevent its working loose. The turnbuckles receive the divided or two-part threaded eyebolts $h'''$, the outer ends of which are pivotally mounted in lugs $e$ and adjacent ends of the levers C, as shown at $e'$ and $C''''$, respectively. The connection of the collar or sleeve E with the levers C is therefore such that when the collar is moved inwardly on its shaft or toward the pulley the adjacent ends of the levers are moved outwardly and when said collar or sleeve is moved outwardly or away from the pulley the adjacent ends of the levers are drawn inwardly, the levers in both instances swinging about their fulcrum connection $d'$ in the arms $d$.

In operation when the collar or sleeve is moved along the shaft G toward the spider D the adjustable links H operate to force the connected ends of the levers C outwardly and away from the center of the shaft G, the levers turning about their fulcrum-points $d'$ and their short arms, which carry the segments or blocks B, being caused to move inwardly, thereby forcing the segments into frictional contact with the ring A of the pulley and locking the pulley to the shaft, so that it rotates therewith and with the clutch devices. Upon a reverse movement—namely, sliding the collar or sleeve outwardly on the driving-shaft—the links H draw the adjacent ends of the levers C inwardly, thereby moving their short arms in an opposite direction and withdrawing the segments or blocks B from their frictional contact with the ring $A'$ of the pulley and disconnecting said pulley from the driving-shaft, so that it now ceases to rotate therewith. The sliding collar or sleeve E is limited to the proper movement in this outward direction on the shaft by a stop J, consisting of a bar lying parallel with the shaft G and secured to the collar or sleeve by means of a cap-screw $j$, said stop working between guide-lugs $d''$ on the spider D and having shoulders near one end adapted to engage the lugs $d'$, and thus limit the inward sliding movement of the collar.

An important feature of my invention as specially applicable to this described form of clutch is the ease and despatch with which a segment B may be disengaged from a lever C and entirely removed from the clutch mechanism and as readily replaced by another segment of like character. In Fig. 1 when the sliding collar or sleeve E is moved away from the spider D and the short arms of the levers thereby moved away from the face of the ring $A'$ the cap-screw $c'$ (shown in detail in Fig. 3) may be withdrawn, when the segment is readily separated from the lever. It is therefore apparent that another segment may readily replace the one removed by simply passing its hub or projection $b'$ in the counterbore $c$ of the lever C and then replacing the cap-screw $c'$, when the clutch is again ready for operation. The segment and the lever are guided into the proper relative position and kept firmly in this position by a pin $c''$ in the lever engaging a corresponding hole $b''$ in the segment, as clearly indicated in Figs. 1 and 3.

Whatever wear there may be on the friction levers or facing $b$ is compensated for by lengthening the link connections between the levers and the collar or sleeve E by means of the aforesaid turnbuckles, and, as before noted, these turnbuckles are locked or held in their proper positions and kept from accidentally working loose, and thus making the link connection too long or too short, by the clamping-bolts $h'$ engaging the lugs on each side of the split or divided line of the turnbuckles.

Having thus described my invention, what I claim as new, and desire to secure by Letters Patent, is—

1. In a clutch, the combination of a shaft; a pulley having a ring; segmental blocks to engage said ring; levers to which the blocks are fitted; screws by which the blocks are secured to the levers; a pin-and-hole connection between said levers and the blocks whereby the block and lever are guided into proper position and maintained in position; means for supporting the levers; and means for actuating said levers.

2. In a clutch, the combination of a shaft; a pulley having an annular friction-surface; segmental blocks to engage said surface; a spider on the shaft; levers fulcrumed on the spider and carrying said blocks; a collar slidable on the shaft, and means connecting the collar with the levers; spaced lugs on the spider; and a stop-bar secured to and guided in its movements by said lugs, said bar contacting with the lugs to limit the outward movement of said collar.

3. In a clutch the combination of a driving-shaft; a loose pulley thereon and provided with a ring; a spider having radial arms; levers fulcrumed in said arms; segmental blocks seated in one end of the levers and provided with friction-faces to engage said ring; means for detachably securing the blocks to the lever, each of said levers having a projecting pin and each of said blocks having a hole to receive the pin whereby the block and levers are guided into proper relative position and maintained firmly in position.

4. An improved clutch comprising a driving-shaft; a pulley loose thereon having radial arms; a ring rigid with and projecting at right angles to the arms; a spider having radial arms; levers fulcrumed to the arms of the spider; friction-blocks carried by one end of the levers and a pin-and-hole connection between the blocks and levers; cap-screws securing the blocks to the levers; a collar slidable on the shaft; adjustable connections between said collar and the levers; a stop-bar secured to the collar parallel with the shaft; and spaced lugs on the spider forming a guide for the stop-bar said bar contacting with the lugs to limit the outward movement of the collar.

In testimony whereof I have hereunto set my hand in presence of two subscribing witnesses.

CHARLES JACOBSON.

Witnesses:
E. H. BESHLIN,
NELLIE S. BESHLIN